US008841896B2

(12) United States Patent
Hunter

(10) Patent No.: US 8,841,896 B2
(45) Date of Patent: Sep. 23, 2014

(54) POWER FACTOR CORRECTED SWITCHED MODE POWER SUPPLY

(75) Inventor: Phillip Hunter, Christchurch (NZ)

(73) Assignee: Eaton Industries Company, Christchurch (NZ)

( * ) Notice: Subject to any disclaimer, the term of this patent is extended or adjusted under 35 U.S.C. 154(b) by 752 days.

(21) Appl. No.: 13/061,635

(22) PCT Filed: Aug. 17, 2009

(86) PCT No.: PCT/NZ2009/000169
§ 371 (c)(1),
(2), (4) Date: Apr. 6, 2011

(87) PCT Pub. No.: WO2010/027276
PCT Pub. Date: Mar. 11, 2010

(65) Prior Publication Data
US 2011/0205772 A1 Aug. 25, 2011

(30) Foreign Application Priority Data

Sep. 5, 2008 (NZ) ........................................ 571084

(51) Int. Cl.
G05F 1/00 (2006.01)
H02M 1/42 (2007.01)
H02M 1/44 (2007.01)
(52) U.S. Cl.
CPC ............ H02M 1/4225 (2013.01); Y02B 70/126 (2013.01); H02M 1/44 (2013.01)
USPC ....................................................... 323/285

(58) Field of Classification Search
CPC ................................ H02M 1/4225; G05F 1/54
USPC ......... 323/222, 225, 268, 282, 283, 285, 299; 363/125, 126
See application file for complete search history.

(56) References Cited

U.S. PATENT DOCUMENTS

| 5,459,392 | A | 10/1995 | Mandelcorn | |
|---|---|---|---|---|
| 6,191,564 | B1 * | 2/2001 | Mao | ............................. 323/222 |
| 7,012,413 | B1 | 3/2006 | Ye | |
| 2010/0097041 | A1 * | 4/2010 | Ayukawa et al. | ............. 323/272 |
| 2013/0235631 | A1 * | 9/2013 | Pahlevaninezhad et al. | . 363/126 |

OTHER PUBLICATIONS

International Search Report, corresponding application No. PCT/NZ2009/000169; Nov. 11, 2009.
International Preliminary Report on Patentability, corresponding application No. PCT/NZ2009/000169; Dec. 12, 2010.
Morrison et al., "The Effect of Switching Frequency Modulation on the Differential-Mode Conducted Interference of the Boost Power-Factor Correction Converter" IEEE Transactions on Electromagnetic Compatibility, vol. 49. No. 3, Aug. 2007, pp. 526-535.

(Continued)

Primary Examiner — Matthew Nguyen
(74) Attorney, Agent, or Firm — Myers Bigel Sibley & Sajovec, P.A.

(57) ABSTRACT

A power factor corrected switched mode power supply including a phase shifter that senses the mains frequency and phase shifts it to produce a phase shifted signal which modulates the switching signal supplied to the switches based on the phase shifted signal. The rate of change of the frequency of the switching signal may be controlled to be greatest in regions of greatest power transfer.

20 Claims, 3 Drawing Sheets

(56) References Cited

OTHER PUBLICATIONS

Comandatore et al, "Designing a High Power Factor Switching Prerugulator with the L4981 Continuous Mode" SGS—Thomson Microelectronics Application Note, XP-002183394, Jan. 1, 1997, pp. 1-23.

Willers et al., "An AC-DC Converter with Low Input Distortion and Near Unity Power Factor" The European Power Electronics Association, XP006511622, Jan. 1, 1993, pp. 1-7.

* cited by examiner

POWER FACTOR CORRECTED SWITCHED MODE POWER SUPPLY

RELATED APPLICATIONS

The present application is a 35 U.S.C. §371 national phase application of PCT International Application No. PCT/NZ2009/000169, having an international filing date of Aug. 17, 2009, claiming priority to New Zealand Patent Application No. 571084, filed Sep. 5, 2008. The disclosures of each application are incorporated herein by reference in their entireties. The above PCT International Application was published in the English language and has International Publication No. WO 2010/027276 A1.

FIELD OF THE INVENTION

This invention relates to a power factor corrected switched mode power supply having reduced electro-magnetic interference (EMI) noise.

BACKGROUND OF THE INVENTION

When the switches of a power factor corrected switched mode power supply are switched at a constant frequency there is a significant EMI noise signature at certain frequencies. It is known to modulate the switching frequency applied to the switches to spread the noise spectrum over a wider range. When compared to an un-modulated switching frequency, this reduces the average noise energy.

FIG. 1 shows a prior art approach to modulating the switching frequency based on the phase of the rectified power supply (as per the application note AN833 for the L4981B integrated circuit produced by STMicroelectronics). Curve 1 shows the mains waveform and line 2 the switching frequency modulation. As shown in FIG. 1 the switching frequency is reduced to 80% at the point of maximum power transfer and increased to 100% at minimum power transfer. This approach can reduce EMI noise by about 3 dB. The problem with this approach is that the rate of change of the switching frequency is minimized at the point of maximum power transfer and so much of the EMI noise power is confined to a narrow range.

It would be desirable to provide a power factor corrected switched mode power supply having reduced EMI noise or to at least provide the public with a useful choice.

EXEMPLARY EMBODIMENTS

According to one exemplary embodiment there is provided a power factor corrected switched mode power supply including:
  i. a power rectifier;
  ii. one or more switch for switching power supplied by the rectifier;
  iii. a phase shifter for sensing the mains frequency and phase shifting it to produce a phase shifted signal; and
  iv. a modulator which produces a switching signal supplied to the one or more switches wherein the frequency of the switching signal is modulated based on the phase shifted signal.

According to another exemplary embodiment there is provided a method of controlling the switching frequency of a power factor corrected switched mode power supply comprising:
  i. determining the mains frequency of power supplied to the converter;
  ii. phase shifting the mains frequency to produce a phase shifted signal;
  iii. controlling frequency modulation of a switching signal supplied to switches of the converter according to the phase shifted signal.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention.

DETAILED DESCRIPTION OF EMBODIMENTS OF THE INVENTION

Figure 1:
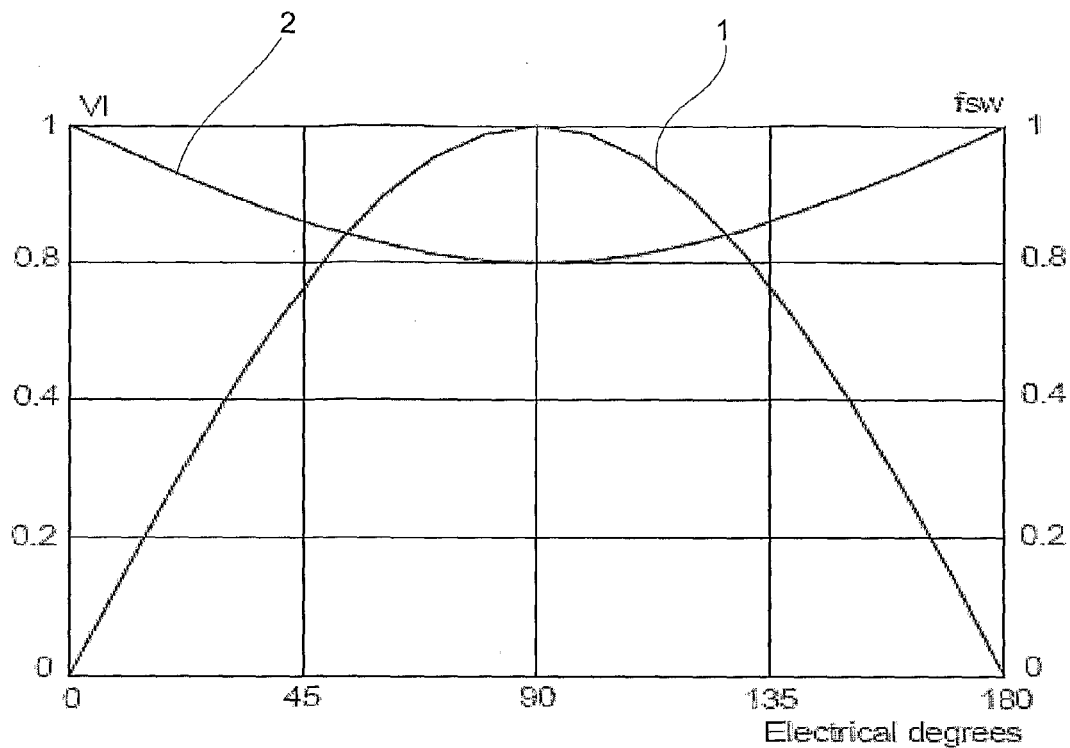
FIG. 1 shows the modulation of the switching frequency in a power factor corrected switched mode power supply with respect to mains voltage according to a prior art approach.
Figure 2:
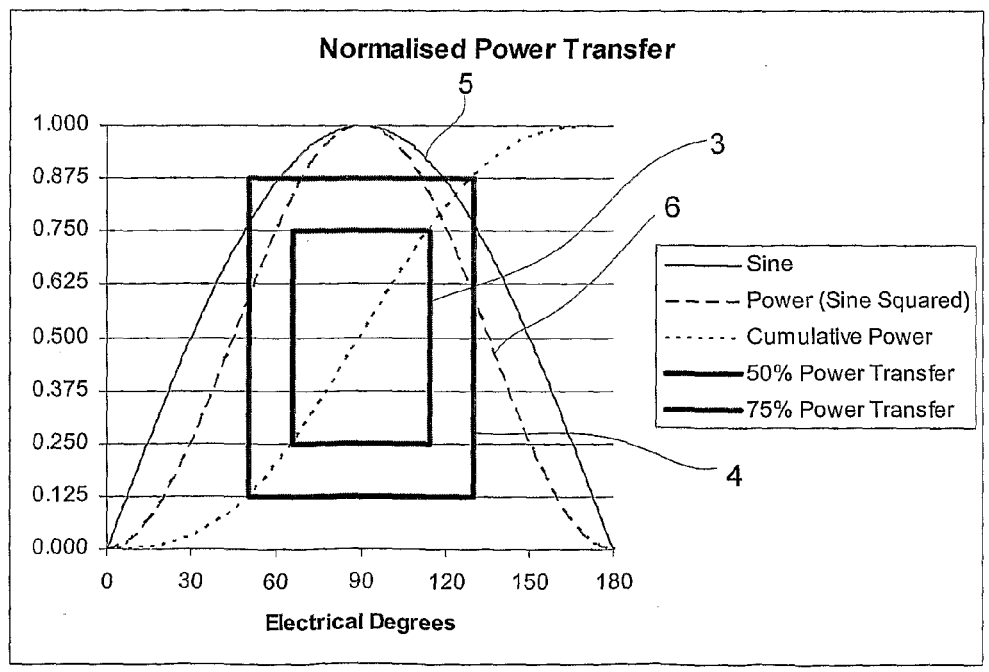
FIG. 2 shows the typical power transfer of a power factor corrected switched mode power supply.

FIG. 2 illustrates the region 3 of 50% power transfer and the region 4 of 75% power transfer with respect to the mains waveform 5 and power transfer waveform 6. It will be seen that most power is transferred near the peak of the mains waveform where the prior art approach had the lowest rate of frequency modulation.

Figure 3:
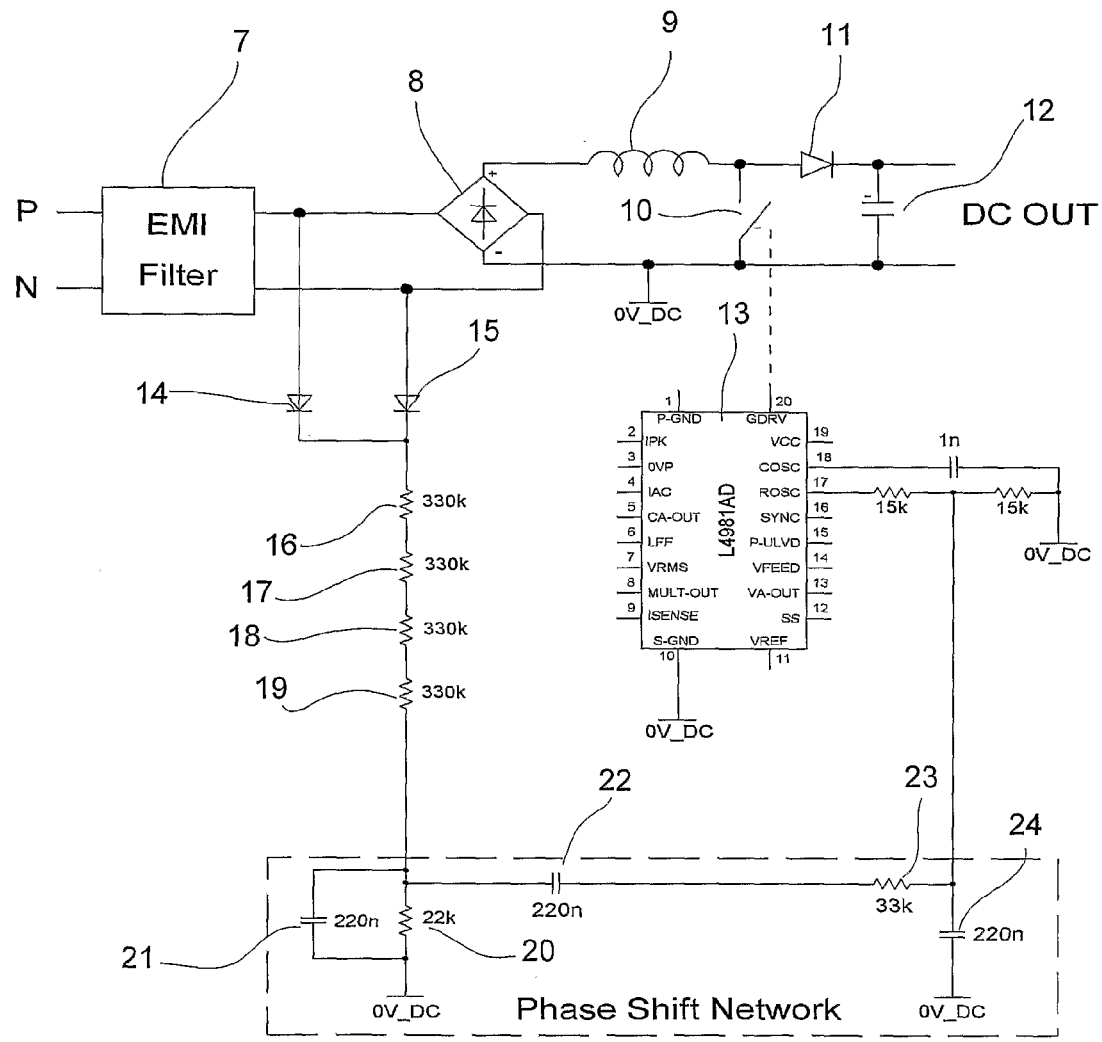
FIG. 3 shows a power factor corrected switched mode power supply according to a first embodiment.

FIG. 3 shows a power factor corrected switched mode power supply according to a first embodiment including a line filter 7 for conditioning the mains supply, a power rectifier 8, an inductor 9, a switch 10, an output diode 11 and an output capacitor 12. Chip 13 (a L4981AD in this embodiment) supplies a switching signal to switch 10 (which may be one or more switches). A sensing rectifier consisting of diodes 14 and 15 provides a rectified mains signal to a voltage divider consisting of resistors 16 to 20 and a smoothing capacitor 21 (which could be replaced by a capacitive divider or a combination of capacitive and resistive elements). The voltage from the tap in the voltage divider is supplied to a phase shifting circuit formed by capacitors 22 and 24 and resistor 23. The output of the phase shifter circuit is supplied to the ROSC terminal of chip 13 and controls the modulation of the switching signal as will be described below.

Figure 5:
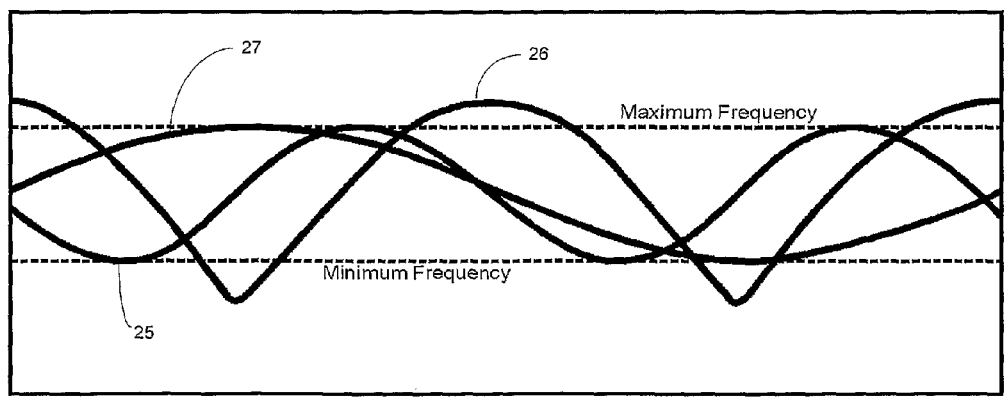
FIG. 5 illustrate the operation of the power factor corrected switched mode power supply of FIG. 3.

FIG. 5 shows a mains waveform 26 and the phase shifted signal 25 supplied to the ROSC terminal of chip 13. It will be seen that the modulation waveform 25 is twice the frequency of the mains and exhibits its maximum rate of change during periods of maximum power transfer. This spreads the EMI noise spectrum over a wider range. Waveform 27 illustrates another possible modulation strategy with modulation waveform 27 at mains frequency and lagging the mains by 90°.

Figure 4:
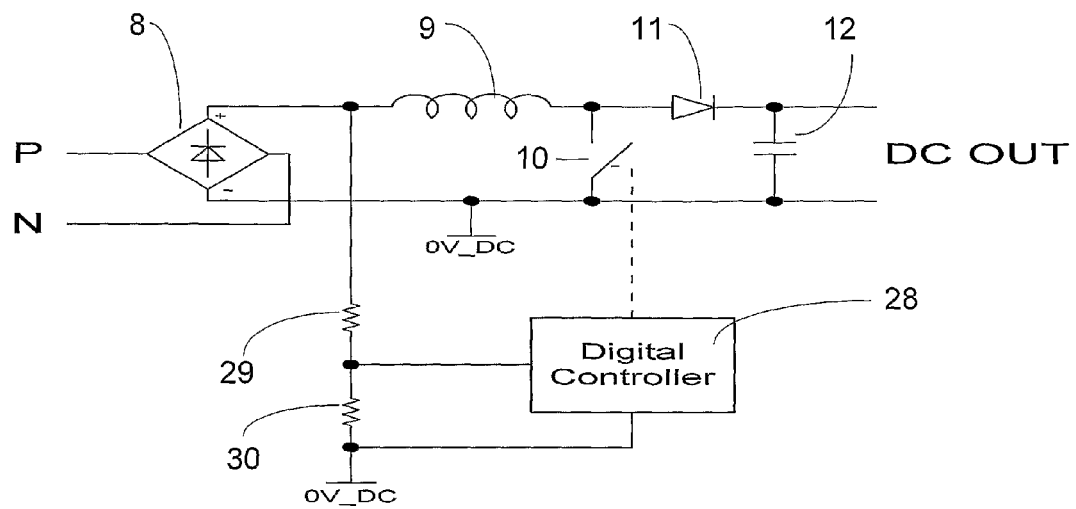
FIG. 4 shows a power factor corrected switched mode power supply according to a second embodiment.

Referring now to FIG. 4 an alternative embodiment is shown, which is identical to the power factor corrected switched mode power supply shown in FIG. 3 except that the passive phase shifter and chip 13 have been replaced with a digital controller 28 that performs the phase shift and/or control functions. The voltage sensor has been simplified to a resistive divider formed by resistors 29 and 30. Otherwise like components have been given the same numbering as in FIG.

3. A digital signal processor may be used to implement the phase shift or more advanced signal processing characteristics such as modulating the switching frequency according to any desirable/arbitrary waveform.

It has been found that by maximizing the change in switching frequency with maximum power transfer that EMI noise can be reduced by an additional 3 dB over the prior art method described (i.e. 6 dB EMI noise reduction over a fixed switching frequency).

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A power factor corrected switched mode power supply including:
 a power rectifier having an input configured to be coupled to an AC power supply mains;
 a switch coupled to an output of the power rectifier;
 a voltage sensor coupled to the input or the output of the power rectifier and configured to generate a voltage sense signal that indicates a phase of a voltage of the AC power supply mains;
 a phase shifting circuit coupled to the voltage sensor and configured to produce a phase shifted signal from the voltage sense signal; and
 a modulator configured to modulate the switch at a frequency that varies responsive to the phase shifted signal.

2. A power factor corrected switched mode power supply as claimed in claim 1 wherein the phase shifting circuit is arranged to produce a phase shifted signal that, when input into the modulator, enables the modulator to produce a switching signal with a frequency having a rate of change which is greatest in regions of greatest power transfer.

3. A power factor corrected switched mode power supply as claimed in claim 1 wherein the phase shifting circuit is arranged to produce a phase shifted signal that, when input into the modulator, enables the modulator to produce a switching signal with a frequency having a rate of change which is at a maximum in or near the region of maximum power transfer.

4. A power factor corrected switched mode power supply as claimed in claim 1 wherein the phase shifting circuit is arranged to produce a phase shifted signal that, when input into the modulator, enables the modulator to produce a switching signal with a frequency having a rate of change which is lowest in regions of lowest power transfer.

5. A power factor corrected switched mode power supply as claimed in claim 1 wherein the phase shifting circuit is arranged to produce a phase shifted signal that, when input into the modulator, enables the modulator to produce a switching signal with a frequency having a rate of change which is at a minimum in or near the region of minimum power transfer.

6. A power factor corrected switched mode power supply as claimed in claim 1 further comprising a sensing rectifier supplying a rectified mains signal to the voltage sensor.

7. A power factor corrected switched mode power supply as claimed in claim 1 wherein the voltage sensor is a resistor divider.

8. A power factor corrected switched mode power supply as claimed in claim 1 wherein the phase shifting circuit is a passive circuit.

9. A power factor corrected switched mode power supply as claimed in claim 8 wherein the phase shifting circuit is an RC circuit.

10. A power factor corrected switched mode power supply as claimed in claim 1 wherein the phase shifting circuit includes a digital phase shifting circuit.

11. A power factor corrected switched mode power supply as claimed in claim 10 wherein the phase shifting circuit includes a digital signal processor.

12. A method of controlling the switching frequency of a power factor corrected switched mode power supply comprising:
 generating a voltage sense signal that indicates a phase of a voltage of an AC power supply mains coupled to an input of the power supply;
 applying the voltage sense signal to a phase shifting circuit to generate a phase shifted signal; and
 varying a frequency of a switching signal supplied to a switch of a converter of the power supply according to the phase shifted signal.

13. A method as claimed in claim 12 wherein a frequency of the switching signal has a rate of change which is greatest in regions of greatest power transfer.

14. A method as claimed in claim 12 wherein a frequency of the switching signal has a rate of change which is at a maximum in or near the region of maximum power transfer.

15. A method as claimed in claim 12 wherein a frequency of the switching signal has a rate of change which is lowest in regions of lowest power transfer.

16. A method as claimed in claim 12 wherein a frequency of the switching signal has a rate of change which is at a minimum in or near the region of minimum power transfer.

17. A power supply comprising:
 a rectifier having an input configured to be coupled to an AC power source;
 a power converter coupled to an output of the rectifier;
 a voltage divider circuit coupled to the rectifier and configured to generate a voltage sense signal;
 a phase shifting circuit coupled to the voltage divider circuit and configured to generate a phase shifted signal from an output signal produced by the voltage divider circuit; and
 a modulator circuit configured to modulate a switch of the power converter responsive to the phase shifted signal.

18. The power supply of claim 17 further comprising a sensing rectifier coupling the voltage divider circuit to an input of the rectifier.

19. The power supply of claim 17, wherein the voltage divider circuit is connected to an output of the rectifier.

20. The power supply of claim 17, wherein the phase shifting circuit is a passive circuit.

* * * * *